United States Patent
Smith

(10) Patent No.: US 6,947,177 B2
(45) Date of Patent: Sep. 20, 2005

(54) METHOD OF COLOR ACCENTUATION

(75) Inventor: Paul Reed Smith, Lothian, MD (US)

(73) Assignee: Paul Reed Smith Guitars Limited Partnership (Maryland), Stevensville, MD (US)

(*) Notice: Subject to any disclaimer, the term of this patent is extended or adjusted under 35 U.S.C. 154(b) by 42 days.

(21) Appl. No.: 10/362,198

(22) PCT Filed: Aug. 17, 2001

(86) PCT No.: PCT/US01/25654

§ 371 (c)(1),
(2), (4) Date: Jul. 8, 2003

(87) PCT Pub. No.: WO02/17229

PCT Pub. Date: Feb. 28, 2002

(65) Prior Publication Data

US 2004/0105105 A1 Jun. 3, 2004

Related U.S. Application Data

(60) Provisional application No. 60/226,009, filed on Aug. 18, 2000.

(51) Int. Cl.⁷ .............................. H04N 1/40; H04N 1/04
(52) U.S. Cl. ......................................... 358/1.9; 358/2.1
(58) Field of Search .................. 358/1.9, 2.1, 515–523; 382/162, 167

(56) References Cited

U.S. PATENT DOCUMENTS

| | | | |
|---|---|---|---|
| 4,500,919 A | 2/1985 | Schreiber | .................... 358/78 |
| 4,647,963 A | 3/1987 | Johnson et al. | |
| 5,083,198 A | 1/1992 | Haferl et al. | |
| 5,528,377 A * | 6/1996 | Hutcheson | .................. 358/1.9 |
| 5,592,311 A | 1/1997 | Hibi | |
| 6,016,161 A | 1/2000 | Robinson | |
| 6,053,609 A | 4/2000 | Barton et al. | |
| 6,058,207 A | 5/2000 | Tuijn et al. | |
| 6,058,208 A | 5/2000 | Ikeda et al. | |
| 6,069,973 A | 5/2000 | Lin et al. | |
| 6,519,362 B1 * | 2/2003 | Cusmariu | ................... 382/176 |
| 6,594,387 B1 * | 7/2003 | Pettitt et al. | ................ 382/167 |

FOREIGN PATENT DOCUMENTS

| | | | | |
|---|---|---|---|---|
| JP | 04335771 A | * | 11/1992 | .......... H04N/01/40 |
| JP | 2000332958 A | * | 11/2000 | .......... H04N/01/04 |

* cited by examiner

*Primary Examiner*—Thomas D. Lee
*Assistant Examiner*—Stephen Brinch
(74) *Attorney, Agent, or Firm*—Barnes & Thornburg LLP

(57) ABSTRACT

The accentuation method determines the relative magnitude of each color component. It selects and adjusts the magnitude of one or more of the colors as a function of the determined relative magnitudes each color component. The type and amount of the adjustment is a function of the relative magnitude differences. One or more of the magnitudes is adjusted to change the relative magnitudes. Typically, the differences in the subtractive color space is between the lowest and middle magnitude color. Also, typically, the lowest primary color component is reduced.

49 Claims, 4 Drawing Sheets

| Color No. | Original CMYK | Accentuated CMYK | Percentage |
|---|---|---|---|
| 0001 | C M Y<br>90 10 10 | C M Y<br>90 10 10 | 0% |
| 0002 | 90 20 10 | 90 20 09 | 10% |
| 0050 | 90 90 10 | 90 90 2 | 80% |
| 0065 | 90 70 27 | 90 70 14 | 43% |
| 0180 | 35 75 60 | 26 75 60 | 25% |
| 230 | 55 60 15 | 55 60 9 | 40% |
| 250 | 60 60 55 | 60 60 52 | 5% |
| 0306 | 50 20 80 | 50 14 80 | 30% |
|  |  |  |  |

Figure 4

| Original CMYK | Accentuated CMYK | Original RGB | Accentuated RGB |
|---|---|---|---|
| C M Y K<br>90 10 10 22 | C M Y K<br>90 10 10 22 | R G B<br>11 114 160 | R G B<br>11 114 160 |
| 90 20 10 30 | 90 20 9 30 | 20 93 135 | 20 93 138 |
| 90 90 10 0 | 90 90 2 0 | 56 28 108 | 56 26 114 |
| 90 70 27 0 | 90 70 14 0 | 52 61 112 | 53 60 126 |
| 35 75 60 50 | 26 75 60 50 | 76 35 37 | 85 36 36 |
| 55 60 15 0 | 55 60 9 0 | 118 88 137 | 118 87 144 |
| 60 60 55 5 | 60 60 52 5 | 99 83 84 | 99 83 87 |
| 50 20 80 8 | 50 14 80 8 | 113 146 60 | 113 155 61 |
|  |  |  |  |

Figure 5

METHOD OF COLOR ACCENTUATION

This application claims benefit of Provisional Appl. Ser. No. 60/226,009, filed Aug. 18, 2000.

BACKGROUND AND SUMMARY OF THE INVENTION

The present invention relates generally to color processing systems and more specifically to a color accentuation system and a component of a color processing system.

Color processing falls into two general categories, namely light projections or displays which are known as additive color systems and pigment or printing systems which are known as subtractive color systems. Color correction systems have been developed to correct for errors in the reader or scanner of the original material, signal transmission or limitations of the display or printing process. In the printing process, the correction can be directed to ink migration and physical color discontinuity. In an image or a video display, color correction can be for errors in the processing system and/or for changing the quality or color of the picture to meet certain criteria and/or tastes.

Examples of prior art systems include U.S. Pat. Nos. 4,674,963; 5,883,984; 6,053,609; 6,057,931 and 6,097,501.

In video and television, there are continuous developments of new formats. The present color accentuation system will help improve digital cameras, TV, video, and HDTV picture quality in both large and small formats. Digital still cameras and digital video cameras would have a button or command that triggers various levels of accentuation that would improve the picture quality. For example, one might take a picture on a dull, overcast day. When the accentuation button is pressed, the image will look like it was taken on a bright day.

The present invention is directed to the concept of accentuating the ultimate color image to be more vivid, color diverse, interesting to the eye and having higher color contrast. The present invention would be compatible with almost any video or print media. This patent description translates well to the CMYK color space, which is the system generally associated with the printing industry. CMYK stands for Cyan, Magenta, Yellow, and Black. These colors are related to the primary colors, red, yellow and blue, with black being considered by this invention as the absence of color. TV's and video use the RGB (Red, Green, and Blue) color space. The color accentuation system described herein can be converted into any known or new color space or system, whether additive (light) or subtractive (ink, paint, etc.)

The primary colors are red, yellow, and blue, and combinations thereof. Rainbow colors are generally considered the vivid, bright colors and are either a primary color or two primary colors mixed at some ratio/percentage in a subtractive color space. In a subtractive primary color space or process, as the percentage of the lowest percentage third color component increases, the overall color becomes more dirty and eventually becomes shades of grays and/or browns. This directly relates to additive color processes and spaces through color space conversion.

An area in an image is a set of adjacent pixels in the image that have substantially the same color, in other words, substantially the same color component magnitudes. A practitioner of ordinary skill will recognize that the benefit of the invention can be attained by determining the accentuation function once for all the pixels in an area because the adjacent pixels have substantially the same color component magnitudes. Therefore, the invention can be applied to an image on a pixel by pixel basis (where the accentuation function is calculated and applied to each pixel individually) or on an area by area basis (where the function is calculated for an area of the image and the same function applied to each pixel in the area). The overall accentuation of the total image in this system is not color linear over the image.

The system determines the relative magnitude of each color component. The color components are the set of colors that are the axes in a given color space. In Red, Blue, Yellow, RBY (the primary color space), R, B and Y are the color components. The invention selects and adjusts the magnitude of one or more of the colors as a function of the determined relative magnitudes of each color component. The type and amount of the adjustment is a function of the relative magnitude differences. One or more of the magnitudes is adjusted to change the relative magnitudes. Typically, the difference in a subtractive color space (e.g., CMY(K)) is between the lowest and middle magnitude color. Also, typically, the lowest color component is reduced in the subtractive color space. In CMY(K), no adjustment is made if only two colors are present in the area or pixel being investigated. Black (K) is not considered a color in the initial accentuation step.

Other objects, advantages and novel features of the present invention will become apparent from the following detailed description of the invention when considered in conjunction with the accompanying drawings.

BRIEF DESCRIPTION OF THE DRAWINGS

FIGS. 4–5 are look up tables in CMYK correlating the original to the accentuated color.

DETAILED DESCRIPTION OF THE PREFERRED EMBODIMENTS

Figure 1:
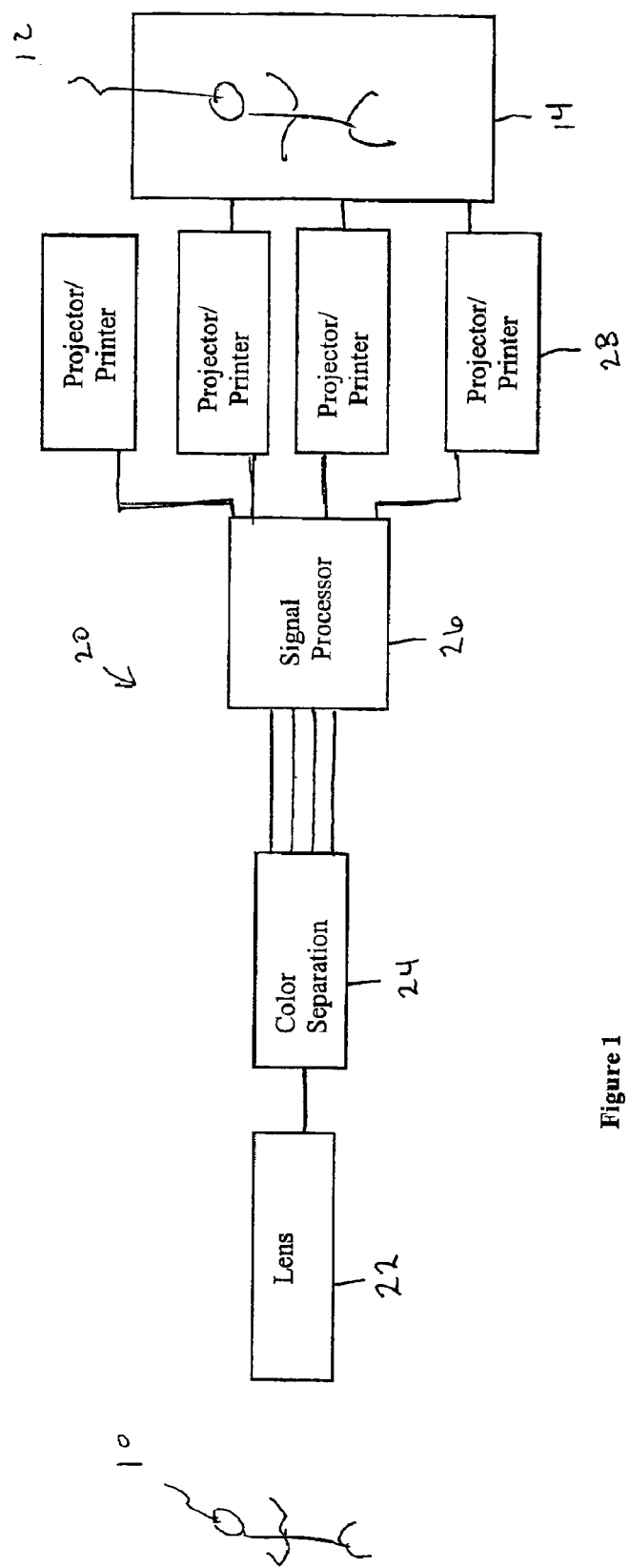
FIG. 1 is a color processing system in which the present invention can be incorporated.

The core of this invention is developed from the primary colors (Red, Yellow, Blue). However, the system functions in both additive and subtractive color spaces through mathematical color-space transforms.

The present invention can be used in two modes. In a first mode, an image, that is encoded using any first color space, is converted into the color component magnitudes of a second color space and has the accentuation function applied in that color space. The resulting image can be converted back to the original color space. Alternatively in a second mode, the accentuation function can be determined in a first color space and then the accentuation function is transformed to any other color space so that an image need not be converted—the transformed function is applied to the image in the color space of the image.

By this means, a practitioner of ordinary skill will recognize that either mode is theoretically equivalent, but the latter is preferred so that data loss by transforming the image in and out of a primary color space (due to numerical rounding and the like) is avoided. Although transformations exist between most color spaces, they are not always perfect, and some loss of color information can take place when converting to and from color spaces. Although the invention can be equivalently used in any color space; the use of the color black in some color space schemes requires special attention.

RYB, the primary color space, is the ideal color space and will be used to explain the concept of the invention.

Since RYB is not presently available in a typical system, the invention will be explained also with respect to CMY and RGB (RGB being used in video applications and which is also an additive color space). CMY(K) (a subtractive color space) is used as the color space for an embodiment of this system because it is a commonly used subtractive color space. However, because the magenta in the CMYK color space has a small blue component, operations on magenta affect two colors (red and blue), not one (red). The RGB and CMY(K) color spaces have known direct mathematical relationships to each other.

The present system looks at the relative differences between the colors and makes the correction based on a function. In CMYK, K, the black, is not adjusted in the initial function. But black still must be part of the color percentage, so that the conversion of CMYK to another color space is accurate. When all three colors CMY are substantially equal in color, they are "dirty" in color. As the differences in percentage between the colors becomes larger, the higher magnitude perceived primary colors become more dominant. The lowest magnitude value color component of the three colors creates, in the combination the other two colors, a pastel dirtiness, grayness, brown-ness or a perceived lack of contrast, vividness or perceived sharpness. The present invention creates a higher color contrast, sharper, clearer picture or color and reduces the effect of the lower of the three color components, pixel by pixel or area by area. Note that the accentuation adjustment may be to one or more of the three colors.

A pixel containing the collection of values for individual color components can be analyzed in percentage magnitudes of those color components. In the CMY(K) space, the new value of the minimum-value color component is calculated based on one of the following equations:

$$\% \text{ MIN}_{New}=[100\%-(\% \text{ MID}-\% \text{ MIN})\%]*\% \text{ MIN} \qquad (a)$$

where:

MIN is the color component (excluding Black, K) in a pixel or area that has the minimum percentage value;

MID is the color component (excluding Black, K) in a pixel or area that has the middle percentage value, MAX is the color component (excluding K, Black) in a pixel or area that has the maximum percentage value, and $\text{MIN}_{New}$ is the accentuated minimum percentage value color component (excluding Black, K); or $$\% \text{ MIN}_{New}=[100\%-f(\% \text{ MID}-\% \text{ MIN})]*\% \text{ MIN} \qquad (b)$$

where f (MID–MIN) is a modifying or scaling function.

The modifying or scaling function f (MID–MIN) result may be set to zero if the difference between MID and MIN is very small. The scaling function f may be a constant times (% MID–% MIN), as in equation (a) The modifying function f (MID–MIN) may also increase, decrease or change the adjustment signified by the difference as a function of any of the color components present or the specific percentage relationship of the color components.

Instead of decreasing the minimum color component MIN, the maximum color component MAX may be increased. Also, both MIN may be decreased and MAX increased. The middle color component MID may also be adjusted. All adjustments are a function of the difference MID–MIN as reflected by the following formulas:

$$\% \text{ MAX}_{new}=\% \text{ MAX}*f_{max}(\% \text{ MID}-\% \text{ MIN}) \qquad (d)$$

$$\% \text{ MID}_{new}=\% \text{ MID}*f_{mid}(\% \text{ MID}-\% \text{ MIN}) \qquad (e)$$

$$\% \text{ MIN}_{new}=\% \text{ MIN}*f_{MIN}(\% \text{ MID}-\% \text{ MIN}) \qquad (f)$$

The function or its equivalent modifies one or more of the component color values based on the difference between the two lowest percentage color component values. This can be algebraically converted to any other color space using well-known mathematical conversions.

In order to maintain brightness close to the pre-processed image, an additional adjustment to all color components then takes place, dependent upon the initial amount adjustment that occurs. All components of pixels or areas can be modified once the function has been calculated for such pixels or areas in order to maintain the original brightness or to modify the brightness of the image.

In general, scaling functions of any type, including non-linear functions for example a quadratic, logarithmic or exponential function or a combination of the three, may be applied to equations (a)–(f) based on any combination of the color component values. Some circumstances may require that more or less scaling occur, for example, as discussed with respect to equation (b). This applies also to equations (d)–(f).

Accentuation may be equivalently performed based on lookup tables. The new color component values are determined by matching the original color component values to those in the table and reading the new color component values out of the table for that color component set.

Other rules and functions can apply such that some tones and other muddy, dull or low intensity colors would not be changed. The goal for color accentuation can be changed through scaling functions to, for example, maintain a particular colors' dullness and make some chosen colors brighter or more intense or to literally change some colors by increasing or decreasing one primary color more than another. As was discussed with respect to equations (b)–(f).

FIG. 1 illustrates a color processing system 20 for reproducing a color image 10, as image 12, on a media 14 if this is a printing process, then media 14 is the object on which the printing is performed. If it's a display like a television or CRT, then media 14 is a display. The color processing system 20 generally includes a lens 22 providing input signals of the image 12 to a color separator 24. The color separator 24 provides a minimum of three colors and in this example, four color signals to the signal processor 26. The signal processor 26 then provides appropriate drive signals to projectors or printers 28, depending upon whether it is a printer or a light projector.

Four projectors/printers are shown but other projector or printers may be used depending upon the number of colors being processed. For example, it could be a three color additive system, a four color separation system, or a six color system.

The color processing system 20 can be thought of as a combination of components to process the color signal. For example, The lens 22 would introduce a color image to a color encoding system 24 that color separates a pixel into color components for a given color space. The encoded image information is presented to a signal processor 26 that applies scaling functions that affect the color accentuation and also applies color space transformations. Upon completion of the signal processing, the image information is transferred to the projector/printer 28 to recombine color components through either a light projection, ink printing system, or other recombinant method to form the processed image 12.

The color accentuation of the present method would be in the signal processor 26. The signal processor 26 may be part of the original camera or scanner and/or may be in the signal processor 26 for the projector or printer. The signal processor 26 may be part of a device that either plays back pre-recorded video media or processes video signals received by the device. The signal processor 26 may include well-known signal correction software modified to incorporate the present invention.

The present method will be described with respect to a four-color separation system, for example, CMYK with the principles applicable to other color separations including the color formats RGB and polar color spaces LCH, HLS, YUV, HSV, HLS and CIE-LUV. Some of these systems deal with different forms of hue (H), saturation (S), luminance or lightness (L, Y), and chrominance (C) or the difference of a three-component color system (U, V). Saturation is the degree of color intensity. Hue is also known as the name of the color and luminance is the degree of light/dark of the color.

Figure 2:
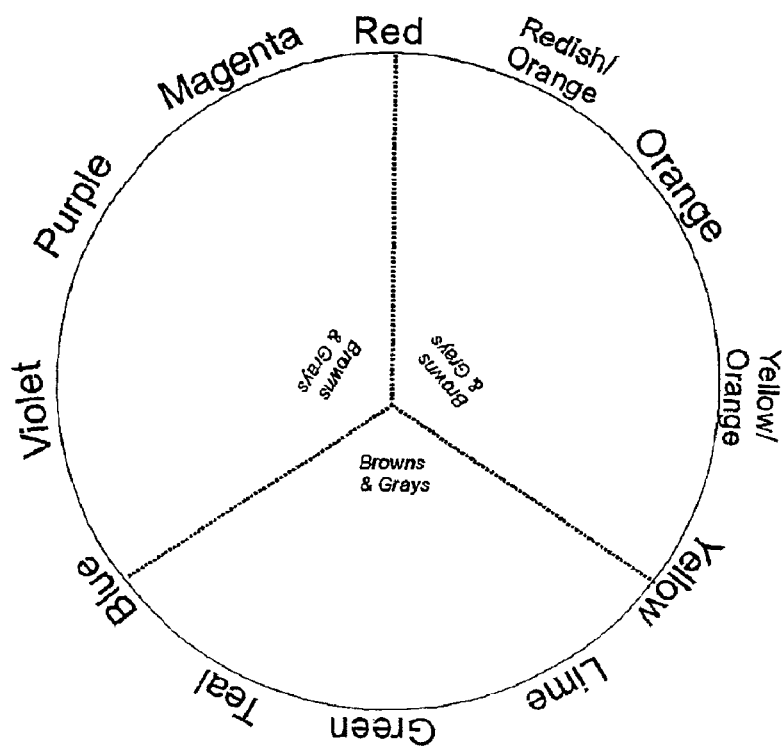
FIG. 2 is a subtractive space color wheel.

In FIG. 2, note that any color on the outside of the wheel is vivid and/or pure. Any color on the outside of the wheel is either one primary color or combinations of two primary colors, as in a rainbow. If any amount of a third primary color is added to the outside of the wheel, the color starts becoming dirty, less vivid, and moves into the interior of the wheel. As it approaches the center, it becomes dirty gray or brown, depending on its component colors. Eventually, as the color component percentages become large and near equal, the color becomes dirty gray which is the center of the wheel.

Figure 3:
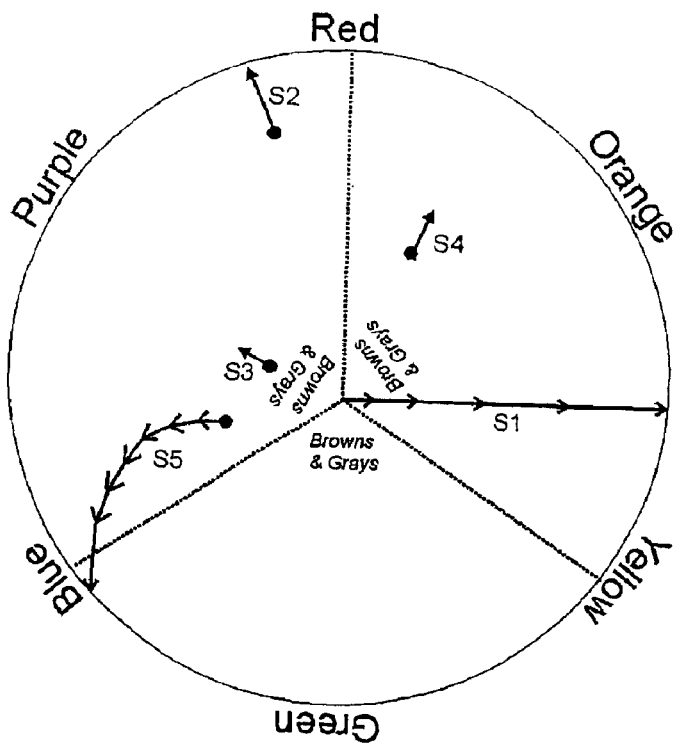
FIG. 3 is a single slice color wheel for RYB from color pipe of FIG. 5 with scaling functions.
Figure 6:
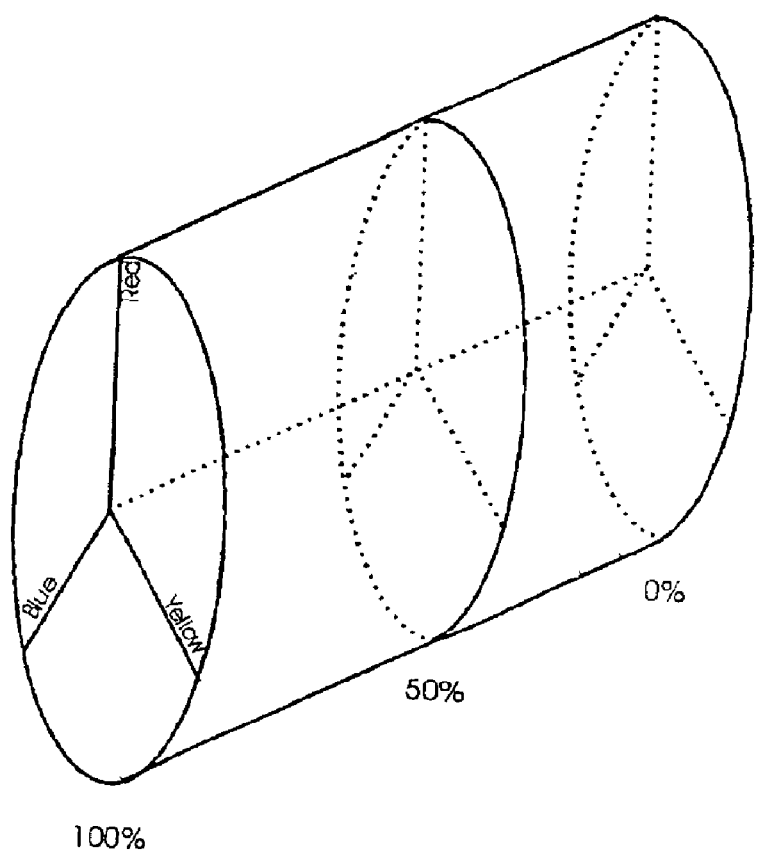
FIG. 6 is a conceptual view of the color pipe.

The FIG. 3 wheel is the 100% slice through a solid color cylinder ("color pipe"), the surface of which contains the three primary colors Red, Yellow, Blue, equally spaced along the circumference. The slice of the color cylinder ranges in intensity from 0% at one end of the cylinder to 100% at the other end FIG. 5 shows a conceptual view of the color pipe.

The percentage shown on the color pipe signifies the maximum value of any of the three primary colors. Thus, if Red is the maximum color at 80%, the color wheel would be the 80% wheel of the color pipe.

The representations of the pipe and the wheel are to illustrate the principles fundamental to this invention. To be on the outside of the color wheel, one color may be at 100% for a 100% slice of FIG. 3, a second color may be at any percentage, but the third color must be at 0%. Any multi-component color which contains more than two of the primaries Red, Yellow, Blue must be inside the "color pipe", and not on the surface. The colors within the circle appear dirty, having tones of brown and gray.

A scaling function $S_1$ is shown which increases between the center and the outside of the wheel. This function increasingly reduces the contribution of the minimum third color as that third color gets closer to the outside of the wheel. A set of scaling function adjustments $S_2$, $S_3$ and $S_4$ are also shown. They illustrate that the scaling function varies as the color moves from dirty, for example, toward pure. $S_2$ shows adjustment for an original color close to a pure color. $S_3$ and $S_4$ show additional smaller adjustments.

The arrows show the adjustment of the value of the color components using a scaling function that modifies the total color component values so that the total color moves towards the outside vivid portion of the circle. The scaling function is based on differences between color component values. The length of the arrow represents the relative adjustment for one example scaling function. The amount of accentuation relates directly to the arrow length for that pixel accentuation. The closer a color is to the outside of the wheel, the more it is accentuated towards a vivid pure color on the outside of the wheel.

$S_1$, $S_2$, $S_3$ and $S_4$ are shown as radii since the adjustment is of only one color component. If changes are made to more than one color component, the result may not be a radii as shown by $S_5$, depending on the function. This example scaling function $S_5$ shows a curved adjustment favoring one of the primary colors. The scaling function can change in any dimension in the color pipe. A scaling function may also be used which moves circumferentially and changes the color or hue. This would result by changing two of the three colors. The color pipe and wheel also have a fourth dimension of white/black (not shown). The fourth dimension adds amounts of white or black to lighten or darken/dull any color on the pipe/wheel by degrees of colorless gray (black into white). The pipe/wheel dimensions are red, yellow, blue, and black.

In the example illustrated in FIG. 4 for the CMYK color system, the original value is shown in one column as a percentage of saturation for each of the component colors. Black or K has not been shown for sake of clarity since it is not used to determine the adjustment nor is it adjusted. During the next phase in FIG. 4, for example, the accentuated/adjusted numbers are shown in the third column and the last column shows the percentage of accentuation. In this example, the difference between the middle and lowest color magnitude is taken and this difference is the accentuation percentage factor.

For example, with a simple % scaling function for color 0001 having C=90, M=10, Y=10, the difference between M and Y is zero and therefore there is zero percent adjustment to the lowest color. Alternatively, since both M and Y dirty C, both M and Y may be reduced the same amount.

For the color 0002 having C=90, M=20, Y=10, the difference between M and Y is 10 so the third color Y is reduced by 10% from 10 to nine. For the color 0306, C=50, M=20, Y=80 become C=50, M=14, Y=80. The difference between C and M is 30 and therefore there is a 30% reduction in the lowest percentage color M. For the color 0065, the percentages are C=90, M=70, Y=27. The difference between M, the middle color, and Y, the lowest color, is 43, so Y now becomes 14. Thus, the "dirtiness" of this color has reduced by approximately half using this function. This system method can be converted to any other color system by known conversions.

In the present system, no specific color is adjusted, but the lowest of three colors is the one that is adjusted downward in magnitude. This system works in such a way that grays, browns and pastels do not change or change little. When the color is gray-brown, for example, 70% for cyan, magenta and yellow, there is no accentuation because there are not differences between the minimum color percentages.

Although the example is shown as reducing the percentage of the lowest color, the other color components may also be adjusted. For example, the highest may be increased by itself or in combination with lowering the lowest. Also, the middle color can be raised. All of these reduce the effect or contribution of the third or lowest color.

As previously mentioned, there are certain combinations which could or could not be changed. For example, for color C=250, Y=60 and M=55, the Y and M components differ by only five percent. This color would not become substantially more intense or vivid by lowering 55 by the five percent using these methods. Thus, this color could remain in its present state by setting the scaling function result to zero.

Also, depending upon the order of the percentage of the color or other color component information, the scaling function may be a modification of the numerical difference of the middle and lowest percentage of color components, as discussed with respect to equations (b)–(f). The primary colors have different degrees of dirtiness. Blue contributes more dirtiness than red which contributes more than yellow for example. Thus if blue is the lowest percentage color component it will be reduced more than if red or yellow was the lowest percentage color component.

It is well understood in the art that equations describing calculations in a given color space may be transformed algebraically into different but functionally equivalent calculations in a different color space using well-known mathematical transformations such that the results are substantially equivalent. For example, the practitioner in the art will recognize that the equation (b) which is defined for use in a subtractive color space (e.g. CMYK), can be transformed for use in an additive color space (e.g. RGB) as follows, for example:

$$\% \text{ MAX}_{New} = \% \text{ MAX}_{old} + f(\% \text{ MAX}_{old} - \% \text{ MID}_{old})\% * (100\% - \% \text{ MAX}_{old}). \quad (g)$$

In this example, the algebraic transformation of the equation from a subtractive space to an additive space converts the comparison of the two minimum color component magnitudes to examining the magnitudes of the two maximum color components and scaling the color component values based on the difference between the maximum and middle values of the three color components. In other words, the practitioner of ordinary skill will recognize that lowering the magnitude of the minimum color in CMYK is the equivalent of raising the magnitude of the maximum color in RGB space.

Thus, the equations can be generalized for the subtractive color space as:

$$\% \text{ MIN}_{New}, \text{MID}_{New}, \text{MAX}_{New} = f_{MIN, MID, MAX}((\% \text{ MID}_{old} - \% \text{ MIN}_{old}), (\text{MIN}_{old}, \text{MID}_{old}, \text{MAX}_{old})) \quad (h)$$

and for the additive color space as:

$$\% \text{ MAX}_{New}, \text{MID}_{New}, \text{MIN}_{New} = f_{MAX, MID, MIN}((\% \text{ MAX}_{old} - \% \text{ MID}_{old}), (\text{MAX}_{old}, \text{MID}_{old}, \text{MIN}_{old})). \quad (i)$$

The present system is considered a color accentuation system, not a color correction system, although it is expected that this process can become a new kind of color correction. Color correction implies that the to be printed or displayed color is corrected to be identical to the original image.

The present method or system has used the amplitude of the color components as the parameter to be measured and adjusted. Other parameters of the system may be used for the relative measures and adjustment. They could include any of color, hue, saturation, luminance, chrominance, focus or any other video control.

Although the present invention has been described and illustrated in detail, it is to be clearly understood that the same is by way of illustration and example only, and is not to be taken by way of limitation. The spirit and scope of the present invention are to be limited only by the terms of the appended.

What is claimed:

1. A method of color accentuation in a color processing system comprising:

determining which color components of at least one pixel in a color image, relative to each other, are either the maximum and middle components for an additive space or the middle and minimum magnitudes for a subtractive space;

determining either, for a subtractive color space, the difference of the magnitude of the middle color component to the minimum color component or, for an additive color space, the difference of the magnitude of a maximum color component to a middle color component; and selecting and adjusting the magnitude of one or more of the color components either as a function of the determined difference of the middle color component to the minimum color component for the subtractive color space or as a function of the determined difference of the maximum color component to the middle color component for the additive color space.

2. A method according to claim 1, wherein the adjustment is proportional to the relative magnitude of the difference.

3. A method according to claim 1, wherein the magnitude of the color component is adjusted only if the magnitude difference is above a predetermined value.

4. A method according to claim 1, wherein for the subtractive color space, the minimum color component is selected and adjusted, and for the additive color space, the maximum color component is selected and adjusted.

5. A method according to claim 1, wherein the magnitude is adjusted to increase the relative magnitude between the maximum and minimum magnitude color component.

6. A method according to claim 1, wherein the color components are translated from a first color space into a second color space before the determining steps and translated back to the first color space from the second color space after the adjusting step.

7. A method according to claim 1, wherein the process is performed on an area basis which contains more than one pixel.

8. A method according to claim 1, the process is performed using a microprocessor accessing a memory.

9. The method of claim 1 where only one color component is adjusted.

10. The method of claim 1 where only two color components are adjusted.

11. A method according to claim 1, wherein the color components of the image data are in a first color space, wherein at least one of the first determination step, the second determination step and the adjustment step is transformed for use in a second color space and the color components are transformed into the second color space.

12. A color processing system for receiving color image data for one or more images, the system including a signal processor and wherein the signal processor:

receives or derives color components from the color image data;

determines which colors of at least one pixel of the color components, relative to each other, are either the maximum and middle components for an additive space or the middle and minimum magnitudes for a subtractive space;

determines either, for the subtractive color space, the difference of the magnitude of a middle color component to the minimum color component or, for the additive color space, the difference of the magnitude of a maximum color component to a middle color component; and selects and adjusts the magnitude of one or more of the color components either as a function of the determined difference of the middle color component to the minimum color component for the subtractive color space or as a function of the determined difference of the maximum color component to the middle color component for the additive color space.

13. A system according to claim 12, wherein the adjustment is proportional to the relative magnitude difference.

14. A system according to claim 12, wherein the magnitude of the colors is adjusted only if the magnitude difference is above a predetermined value.

15. A system according to claim 12, wherein, for the subtractive color space, the minimum color component is selected and adjusted and, for the additive color space, the maximum color component is selected and adjusted.

16. A system according to claim 12, wherein the magnitude is adjusted to increase the relative magnitude between the maximum and minimum magnitude color.

17. A system according to claim 12, wherein the processor translates the color components from a first color space into a second color space before the determinations and translated back to the first color space from the second color space after the adjustment.

18. A system according to claim 12, wherein the processor operates on a pixel basis.

19. A system according to claim 12, wherein the processor operates on an area basis.

20. A system according to claim 12, wherein the color processing system is one of a camera, video recorder, optical scanner and printer.

21. A system according to claim 12, wherein the color processing system is one of an image display, a video display and a printer.

22. The system according to claim 12, wherein the magnitude is adjusted using a scaling function selected from the group of linear and non-linear functions.

23. The system of claim 12, wherein the color processing system is one of a pre-recorded video media playback device or a video signal processing device.

24. A system according to claim 12, including after the magnitude adjustment, adjusting the magnitude of the colors to adjust the brightness.

25. The system according to claim 12 including a lookup table storing the adjustment.

26. The system according to claim 12, wherein the additive color space is red, green and blue.

27. The system according to claim 12, wherein the determinations and the selection and adjustment are transformed into the equivalent operations in a polar color space including LCH, HLS, YUV, HSV, HLS, and CIE-LUV.

28. A system according to claim 12, wherein the magnitude is adjusted as a function of the order of the color components.

29. The system according to claim 12, wherein the subtractive color space is cyan, magenta and yellow.

30. The system of claim 12, wherein only one color component is adjusted.

31. The system of claim 12, wherein only two color components are adjusted.

32. A system according to claim 12, wherein the color components of the image data are in a first color space, wherein at least one of the first determination step, the second determination step and the adjustment step is transformed for use in a second color space and the color components are transformed into the second color space.

33. A system according to claim 12, wherein the color processing system stores the output as a digital file on a recordable media.

34. A method of color accentuation of a color image made up of areas of at least one pixel, encoded in a color space, the method comprising:

detecting in each area which colors component in the area, relative to color components, are either the maximum and middle components for an additive space or the middle and minimum magnitudes for a subtractive space; and changing the magnitude of color components in each pixel in the area in accordance with a pre-determined scaling function applied to the detected color components to increase the difference between a maximum and a minimum color component in each area, the scaling function being based on either a difference of a middle color component to the minimum color component for a subtractive color space or on a difference of the maximum color component to the middle color component for an additive color space for each area.

35. The method according to claim 1 or 34, wherein the magnitude is adjusted using a scaling function selected from the group of linear and non-linear functions.

36. A video media playback device that applies the method according to claim 1 or 34 to inputted video data.

37. A video media playback device that applies the method according to claim 1 or 34 to video data read from media.

38. A video signal processing device that applies the method according to claim 1 or 34 to inputted video signals.

39. The method according to claim 1 or 34, including after the magnitude adjusting, adjusting the magnitude of the colors to adjust the brightness.

40. The method according to claim 1 or 34 reading the adjustment from a lookup table.

41. The method according to claim 1 or 34, wherein the additive color space is red, green and blue.

42. The method according to claim 1 or 34, wherein the method of color accentuation is transformed for use in a polar color space including LCH, HLS, YUV, HSV, HLS, and CIE-LUV.

43. A method according to claim 1 or 34, wherein the magnitude is adjusted as a function of the order of the color components.

44. The method according to claims 1 or 34, wherein the subtractive color space is cyan, magenta and yellow.

45. The method according to claim 1 or 34, wherein the method of color accentuation is transformed for use in a three variable color space.

46. A method according to claim 45, wherein the magnitude is adjusted by a scaling function whose value is determined by the color of the color component being adjusted.

47. The method according to claim 1 or 34, wherein the method of color accentuation is transformed for use in a two variable color space.

48. A method according to claim 1, 2, 3, 4, 5, 6, 7, 8, 34, or 9, wherein the magnitude is adjusted by a scaling function whose value is determined by the color of the color component being adjusted.

49. A system according to claim 12, 13, 14, 15, 16, 17, 22, or 30, wherein the magnitude is adjusted by a scaling function whose value is determined by the color of the color component being adjusted.

* * * * *